Patented Dec. 27, 1949

2,492,403

UNITED STATES PATENT OFFICE 2,492,403

MANUFACTURE OF ALIPHATIC ACID ANHYDRIDES FROM UNSATURATED HYDROCARBON ACID ANHYDRIDES

Gordon Ernest Smith and William Hunter, Spondon, near Derby, England, assignors to Celanese Corporation of America, a corporation of Delaware No Drawing. Application December 4, 1946, Serial No. 713,914. In Great Britain January 16, 1946

2 Claims. (Cl. 260—546)

This invention relates to the manufacture of the anhydrides of saturated aliphatic carboxylic acids especially butyric anhydride.

An object of the invention is to provide a process for making butyric anhydride which is satisfactory from both the technical and economic points of view; such a process must be simple and easily carried out and must not be unduly sensitive to small changes in reaction conditions, so that it does not require excessively delicate control; furthermore, it should make use of cheap and readily obtainable raw materials.

One such raw material which is becoming increasingly available is crotonaldehyde, and it has in the past been proposed to convert crotonaldehyde to crotonic acid by oxidation. It is possible to hydrogenate crotonic acid to butyric acid, from which butyric anhydride can be made by reaction with acetic anhydride. Practical experience however has shown us that the hydrogenation of crotonic acid is not a very satisfactory reaction for use on a technical scale.

We have now found that crotonic anhydride can be hydrogenated successfully to butyric anhydride, and that this hydrogenation process is, surprisingly, free from the difficulties associated with the hydrogenation of crotonic acid to butyric acid, and is admirably suited to technical use. Since crotonic anhydride can readily be made by heating crotonic acid with acetic anhydride, it becomes possible to produce butyric anhydride by a simple and easily operated process that makes use of cheap and readily obtainable raw materials.

According to the invention the anhydrides of saturated aliphatic carboxylic acids are made by subjecting the anhydrides of unsaturated aliphatic carboxylic acids to catalytic hydrogenation in the liquid phase.

As the hydrogenation catalyst we prefer to use nickel or cobalt, and especially a catalyst composition prepared by treating an alloy of nickel or cobalt and another element with a substance capable of dissolving out the alloying element partly or completely, as in the well known Raney catalysts. Raney nickel prepared by treating an alloy of nickel and aluminum with a caustic alkali until 20% or more of the aluminum has been removed has been found to be particularly efficient.

The hydrogenation is best carried out under mild conditions of temperature and hydrogen pressure. The temperature should preferably be below 100° C. throughout the process, and especially between about room temperature, say 25° C., and 80° C.; higher temperatures can be employed, but they tend to encourage undesired reactions such as ester formation, so reducing the yield of the desired anhydride and giving rise to purification difficulties. The hydrogen pressure, while preferably above atmospheric, should be moderate, for example 80 or 100 lb./square inch. The catalyst many with advantage be present in amount up to 12% of the weight of the anhydride. If desired the anhydride may be in solution in a suitable inert solvent, for example cyclohexane.

As indicated above, a very important application of the invention is the catalytic hydrogenation of crotonic anhydride to butyric anhydride, especially as part of a process for converting crotonaldehyde or crotonic acid into butyric anhydride. However other unsaturated aliphatic acid anhydrides, including other alpha:beta unsaturated anhydrides such for example as angelic anhydride, can be catalytically hydrogenated to the corresponding saturated carboxylic acid anhydrides under substantially similar conditions. Moreover acrylic anhydride can be converted into propionic anhydride, although owing to the readiness with which acrylic compounds undergo polymerisation it is advisable to carry out the hydrogenation under still milder conditions than with crotonic anhydride; for instance the temperature is preferably kept below about 60° C. by suitably adjusting the hydrogen pressure and thus the rate of reaction, and also it is advantageous to subject the acrylic anhydride to hydrogenation in solution.

The following example illustrates the invention.

*Example*

Crotonic anhydride containing 10% of its weight of Raney nickel is introduced into an autoclave provided with a stirrer and gas inlet, the autoclave is closed and stirring begun. Hydrogen is then admitted through the gas inlet to a pressure of 100 lbs./square inch. Reaction begins at room temperature, and the temperature is allowed to rise to about 80° C., further rise being prevented if necessary by reducing the hydrogen pressure. When the absorption of hydrogen ceases the products are removed from the autoclave and filtered free from catalyst. They consist of nearly pure butyric anhydride, with a small proportion of butyric acid, and a still smaller proportion of butyl butyrate.

Having described our invention, what we desire to secure by Letters Patent is:

1. Process for the production of butyric anhydride, which comprises heating crotonic anhydride in the liquid phase with hydrogen under pressure in the presence of Raney nickel to a temperature below 100° C.

2. Process for the production of butyric anhydride, which comprises heating crotonic anhydride in the liquid phase with hydrogen in the presence of Raney nickel to a temperature of 80° C. under a hydrogen pressure of 100 lbs. per sq. in.

GORDON ERNEST SMITH.
WILLIAM HUNTER.

REFERENCES CITED

The following references are of record in the file of this patent:

UNITED STATES PATENTS

| Number | Name | Date |
|---|---|---|
| 2,198,153 | Coons | Apr. 23, 1940 |
| 2,245,404 | Kise et al. | June 10, 1941 |

OTHER REFERENCES

Ellis, Hydrogenation of Organic Substances, pages 198 to 200, 1930.

Adkins, Reactions of Hydrogen, page 128, 1937.